Oct. 27, 1931.  A. DINA  1,828,768
FILM GUIDE
Filed Sept. 12, 1927
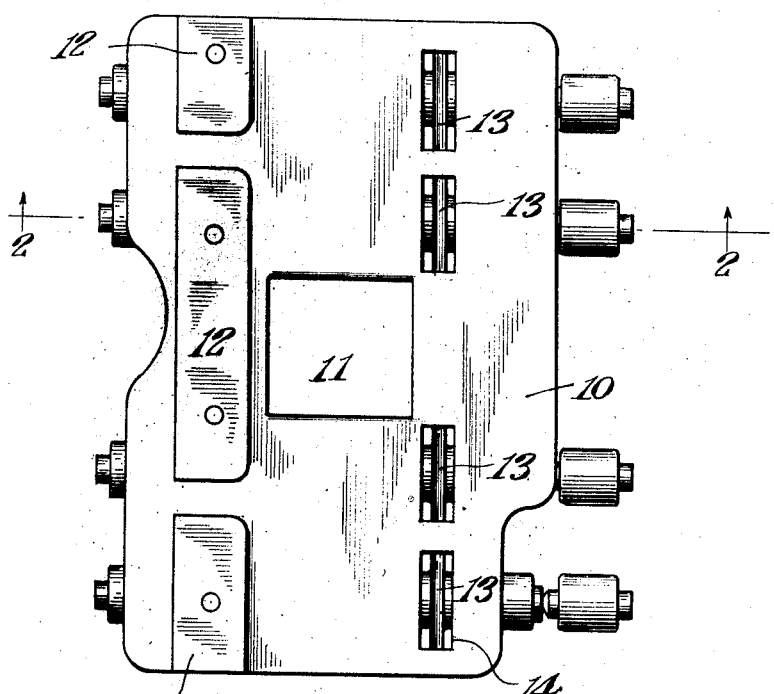
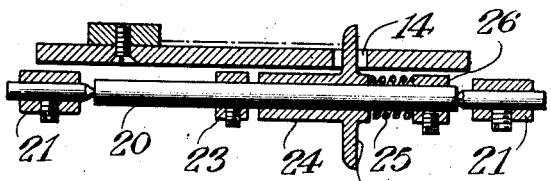
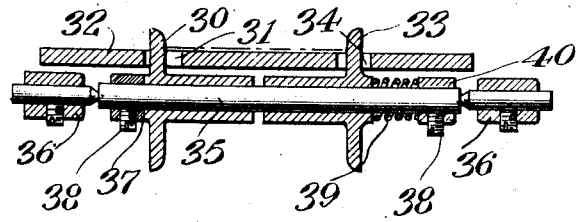
Inventor
Augusto Dina
By his Attorney
Howard W. Dix Patented Oct. 27, 1931

1,828,763

UNITED STATES PATENT OFFICE

AUGUSTO DINA, OF JERSEY CITY, NEW JERSEY, ASSIGNOR TO INTERNATIONAL PROJECTOR CORPORATION, OF NEW YORK, N. Y., A CORPORATION OF DELAWARE

FILM GUIDE

Application filed September 12, 1927. Serial No. 218,927.

This invention relates to film guides and more particularly to guide members for preventing lateral displacement of a film while passing over the aperture plate of a motion picture machine.

The invention provides for passing the film between sets of guide members, one or both of which may be yieldably mounted for exerting pressure upon the edge thereof. The guide members may be formed in a plurality of sections which may be independently displaced to permit passage of irregularities or projections occurring on the film as a result of wear or uneven joining of sections.

One set of guide members may be rigidly mounted for positively locating the film edge with respect to the projection aperture and may comprise a plurality of sections spaced longitudinally of the film for permitting dust and accumulations of foreign material to escape therebetween. The other set of guide members, in accordance with the present invention, comprises a plurality of discs rotatably mounted with their axes transverse to the film and held in firm engagement therewith by means of suitable spring members. The discs are capable of rotating as the film is moved through the projection head thereby eliminating sliding friction and reducing the wear on the film.

The invention also consists in certain new and original features of construction and combinations of parts hereinafter set forth and claimed.

Although the novel features which are believed to be characteristic of this invention will be particularly pointed out in the claim appended hereto, the invention itself, as to its objects and advantages, the mode of its operation and the manner of its organization may be better understood by referring to the following description taken in connection with the accompanying drawings forming a part thereof, in which Fig. 1 is an elevation of an aperture plate constructed in accordance with this invention;

Fig. 2 is a section on the line 2—2 of Fig. 1; and

Fig. 3 is a sectional view of a modification thereof.

Like reference characters denote like parts in the several figures of the drawings.

In the following description and in the claim parts will be identified by specific names for convenience, but they are intended to be as generic in their application to similar parts as the art will permit.

Referring to the drawings more in detail, the mechanism for guiding a film past the projecting aperture of a motion picture projecting machine is shown as comprising a plate 10 forming a part of the projection head and having the aperture 11 therein arranged in alignment with the lenses of the machine.

One set of guide members may comprise a plurality of stationary bars 12 longitudinally spaced along the line of movement of the film and spaced apart to permit accumulations of foreign materials to escape therebetween. Said bars may be provided with rounded edges to decrease the wear and friction on the film. The other of said guide members may comprise a plurality of rotatable discs 13 resiliently held in contact with the film edge whereby the film may be held between said discs and said stationary bars 12. Discs 13 may be mounted at the rear of the aperture plate 10 and extended through openings 14 therein. It is to be understood that it is preferred to have bars 12 as separate elements but they may constitute a single long unit.

Each of said discs 13 may be supported upon a shaft 20 (Fig. 2) which is rotatably mounted in suitable bearings 21, said bearings being supported in any desired manner (not shown). Collar 23, rigidly secured upon shaft 20, is adapted to cooperate with an elongated hub portion 24 of disc 13 for limiting the longitudinal movement thereof when the film is removed. Spring 25 is extended between the hub portion of disc 13 and collar 26 which is rigidly located on shaft 20 and serves to hold disc 13 firmly against the edge of the film. The inner edge of the periphery of discs 13 should preferably be rounded to permit the film to be readily passed thereover and to facilitate insertion of the film in the machine.

In the operation of the apparatus above described, when the film is passed over aperture 11 in plate 10, lateral movement thereof will be prevented by stationary guide bars 12 cooperating with resiliently mounted discs 13. Springs 25 are designed to exert a sufficient amount of edge pressure on the film to positively hold the same against members 12 but should not exert sufficient pressure to cause the film to buckle.

Should any irregularities or projections occure on the film edge, the resilient mounting of discs 13 will permit passage thereof without causing lateral movement of the film. The film will consequently be positively engaged by at least two of the discs even though a third disc is displaced axially by a projection on the film edge. Hence the arrangement prevents lateral movement of the film while permitting the various guide members to be successively depressed to compensate for irregularities of the film edge and varying width of film.

The stationary guide member has been shown as formed in a plurality of sections 12 spaced apart longitudinally of the film in order to provide means for the removal of accumulations of extraneous matter. The rounded corners of the guide members prevent undue wear and decrease the possibility of tearing or further accentuating any irregularities which may occur on the film edge.

In the modification of Fig. 3, a pair of discs are shown for guiding the film, one disc being located adjacent each edge thereof. Discs 30 and 33, extended through apertures 31 and 34 respectively in guide plate 32, are mounted upon rotatable shaft 35 which is supported in suitable bearings 36 in any desirable manner. Disc 30 may be rigidly secured to said shaft or be limited in its movement as by means of collar 37 and set screw 38. Disc 33, however, is loosely journalled on shaft 35 and is pressed into firm engagement with the film by means of spring 39 extending between disc 33 and fixed collar 40. Said discs 30 and 33 may be provided with elongated hub portions in order to increase the rigidity of the assembly and to provide stopping means for disc 33 when the film is removed. The periphery of discs 30 and 33 at the inner edges thereof may be rounded in order to prevent wear on the film and to facilitate insertion thereof.

In this modification, the film is held between the two discs and prevented from moving laterally by means of the pressure exerted thereby. Disc 30, being incapable of axial movement during operation of the projection machine, positively guides one edge of the film while disc 32, being mounted for movement in an axial direction, serves to hold the film against disc 30 but is capable of being displaced for permitting the passage of irregularities or projections occurring on the film edge.

A plurality of pairs of discs, spaced along the aperture plate, should preferably be employed for positively guiding the film past the aperture therein as shown in Fig. 1. Since the discs are free to turn as the film is moved over the aperture plate, friction on the film is reduced to a minimum.

In the arrangement shown in Figs. 1 and 2, the stationary guide members serve for positively positioning the film edge while the rotatable discs exert a sufficient pressure on the film for holding the same against the stationary guide members. The discs, however, being free to turn, reduce the friction on the film and are independently movable in an axial direction for permitting passage of irregularities thereon.

In the drawings accompanying and forming a part of this specification, a practical commercial embodiment of the invention is shown, but as such illustration is primarily for purposes of disclosure, it will be understood that the structure may be modified in various respects without departure from the broad spirit and scope of the invention as hereinafter defined and claimed.

What is claimed is:

In combination with an aperture plate having an aperture therein, a film guide for said plate comprising an elongated stationary bar mounted adjacent said aperture and adapted to direct one edge of a film past said aperture and additional guiding bars mounted above and below said first mentioned bar and spaced therefrom to permit passage of extraneous material whereby said material is prevented from interfering with the alignment of the film as the film passes said aperture, the corners of said bars normally contacting with the edge of the film being rounded and a plurality of rotating guides mounted behind said plate and slidable axially and extending through openings in said plate in a position to engage the other edge of said film and resilient means for maintaining said rotating members in engagement with said edge, said guiding means engaging only the edges of said film as the film passes over said plate.

AUGUSTO DINA.